United States Patent [19]

Masson

[11] 3,818,183

[45] June 18, 1974

[54] ELECTRONIC TEMPERATURE CONTROL SYSTEM

[76] Inventor: J. Gilbert Masson, 4117 Sacramento Dr., Greensboro, N.C. 27406

[22] Filed: May 9, 1973

[21] Appl. No.: 358,819

[52] U.S. Cl. ............... 219/497, 219/483, 219/486, 219/494, 219/501, 307/117, 323/19
[51] Int. Cl. ............................................. H05b 1/02
[58] Field of Search ........... 219/483, 486, 494, 499, 219/501; 307/117; 323/19

[56] References Cited
UNITED STATES PATENTS

| | | | |
|---|---|---|---|
| 3,322,933 | 5/1967 | Harnden et al. | 219/501 |
| 3,514,628 | 5/1970 | Pinckaers | 307/117 |
| 3,636,310 | 1/1972 | Hosokana | 219/494 X |
| 3,651,351 | 3/1972 | Quinn | 219/494 |
| 3,674,963 | 7/1972 | Serrano | 219/494 X |
| 3,679,873 | 7/1972 | Bray et al. | 219/494 X |
| 3,890,365 | 6/1971 | Nelson | 323/19 |

*Primary Examiner*—George Harris
*Assistant Examiner*—Fred E. Bell
*Attorney, Agent, or Firm*—Hugh C. Bennett, Jr.

[57] ABSTRACT

A Resistance Temperature Detector (RTD) having a predictable positive temperature coefficient produces a D.C. voltage corresponding to the temperature of a medium. A variable resistor that can be adjusted to some value to match the value of the RTD at predetermined temperatures, in bridge relationship with the RTD, provides a reference voltage for comparison with the voltage produced by the RTD. The output of this bridge is fed to a differential amplifier which in turn feeds three circuits:

1. a high gain D.C. amplifier that actuates through logic circuits the triggering circuit of a solid state A.C. switch controlling power to the medium and regulating the temperature thereof with respect to the reference temperature;
2. a temperature variation detector circuit responsive to plus or minus 2° C. temperature variations from the reference temperature to energize through logic circuits a power relay to switch a possibly defective solid state A.C. switch to a backup unit and energize an annunciator lamp; and
3. a temperature variation detector circuit responsive to plus or minus 4° C. temperature variations from the reference temperature to energize through logic circuits a relay that will disconnect all of the solid state A.C. switches, removing power from the medium and energizing an annunciator lamp.

When the temperature of the medium falls to within the 2° limit, power will be reapplied to the load although both alarm annunciators will remain on. Circuits are also provided to maintain radio frequency interference at the lowest level and to minimize heat dissipation when a solid state A.C. switch is turned on and further to allow power to be disconnected from the circuit for purposes of repair without arcing and/or shock.

8 Claims, 3 Drawing Figures

ELECTRONIC TEMPERATURE CONTROL SYSTEM

BACKGROUND OF THE INVENTION

This invention relates to devices for electrically detecting the temperature of a medium and regulating said temperature relative to a predetermined reference temperature. More particularly, this invention relates to temperature detecting and temperature regulating devices of the type used to closely control the temperature of textile fibers during the texturizing treatment thereof.

The temperature of textile fibers has heretofore been controlled during the texturizing process in a number of ways, which, generally, has included the application of current to a heating element with means provided through a temperature feedback to turn the power off when the temperature of said element rises above a predetermined value. The power is then turned back on when the temperature falls below the predetermined value. Illustrative of known devices of the type in question is the device disclosed in U.S. Pat. No. 3,322,933.

The known devices, however, are not entirely satisfactory in all respects. A common dissatisfaction with such devices residing in the inability of most to accurately control temperatures within a reasonably narrow limit relative to a predetermined reference temperature. Even small temperature variations occurring during the texturizing treatment of textile fibers will cause substantial variations in the fiber's crystalline formation and effect thereby their dyeing properties as well as other properties important in maintaining good quality control in subsequent processing thereof and leading to a generally unsatisfactory product or one having a higher than desirable cost.

Also, adaptation of many of the known temperature control systems to a multi-channel system, that is a temperature control system to control individually the temperature at a plurality of yarn texturizing stations, is unsatisfactory in that it adds excessive bulk to the texturizing machinery, increases the cost thereof and impedes the operation and servicing of such machinery. Ideally, a temperature control system should provide modular units for each texturizing station which units are relatively compact so as not to impede operation of or maintenance to the texturizing equipment itself and which units are easily interchangeable while the equipment is in operation for repair and replacement thereof.

A common and more serious deficiency with most, if not all, of the known temperature control systems, resides in the fact that upon failure of critical components therein the yarn being texturized at the affected station will be defective because the temperature is not being maintained within satisfactory limits. This condition will continue until the entire texturizing machine is closed down for repair of the defective component or the affected texturizing station is taken out of operation, either alternative resulting in reduced efficiency for the operation as a whole. Some of the known temperature control systems have been provided with warning lamps or other alarm means to indicate the occurrence of failure in the system. Some systems, also, are provided with fail safe features to prevent the system, upon failure of a component therein, from overheating or establishing other undesirable conditions. Neither the presence of warning lamps nor the use of fail safe features, however, overcome the deficiencies herein described.

SUMMARY OF THE INVENTION

With the foregoing in mind, the present invention provides an apparatus for controlling by electrical circuits and the like the temperature of a medium, and more specifically an improved apparatus with redundant or backup elements for controlling within predetermined limits the temperature of a medium adapted to apply heat to a yarn during texturizing treatment thereof, which apparatus if of a simple, highly compact and durable construction, thereby reducing the bulk and complexity of the texturizing machinery resulting from the mounting of accessories thereon; which apparatus includes components that are easily removed and replaced to effect repair and/or replacement thereof during operation of the texturizing machinery without substantially, if at all, interfering with said machinery's productive output; which has a high degree of accuracy to maintain said temperature within a predetermined range; which apparatus includes backup components and switching means to automatically switch to said backup components when conditions indicate that a primary component might be defective; which also includes warning lamps or other signalling means to indicate the occurrence of a component failure and transfer to a backup component; and which apparatus provides means to keep radio frequency at the lowest level and to minimize the heat dissipation at turn on and, further, to reduce arcing and minimize the likelihood of shock to repair personnel.

In a preferred embodiment of the invention, a Wheatstone bridge including two adjustable legs provides temperature setting and temperature detecting circuits for the system, with the temperature detecting leg being a Resistance Temperature Detector (RTD) that is positioned in heat sensing relationship with the medium having its temperature controlled. The temperature setting leg may be a variable resistor or, as in the preferred embodiment, an array of resistors that can be adjusted to some value to match the value of the RTD at a predetermined temperature.

The output of this bridge is fed to a differential amplifier which, in turn, feeds: first, a high gain D.C. amplifier that actuates the triggering circuit to a solid state A.C. switch, controlling power to the heating element of a yarn texturizing station, hereinafter referred to generally as the medium, and regulates the temperature thereof relative to the reference temperature; second, a temperature variation detector circuit, comprising herein a plus or minus 2° C. detector circuit, to actuate for one part an annunciator lamp and for the second part a power relay unit which will switch a possibly defective solid state A.C. switch to a backup unit, thereby returning the temperature control of the medium to within 2° C. of the reference temperature; and finally, a second temperature variation detector circuit, comprising herein a plus or minus 4° C. detector to energize a second annunciator lamp and also energize a relay that will disconnect all the solid state A.C. switches of that channel, removing the power from the medium. When the latter occurs and all switches have been disconnected, temperature of the medium will fall until it is within the 2° limit, wherein power will be reapplied to the medium, therefore, controlling the temperature between +2° and +4° C., while the two alarm annunciators will remain on.

Development of the temperature control system as described herein was prompted upon observation that the component most likely to fail in a system of this type is the solid state A.C. switch element. Furthermore, upon failure of the control system, substantial quantities of yarn at the affected station become defective or, if the station is taken out of production, considerable productive capacity is lost until the condition can be corrected. Accordingly, a system is needed that will automatically switch to a backup solid state A.C. switch, thereby permitting the system to function within acceptable limits until such time as the temperature control system can be tested and serviced as needed during a normal downtime of the texturizing machinery. The temperature control system as contemplated in the preferred embodiment of this invention includes modular-type subcomponents adapted for quick insertion and removal whereby replacement of suspected defective components as identified by a lighted annunciator lamp is accomplished by the maintenance personnel merely unplugging the suspected defective component and plugging in a replacement, which procedure can be completed in seconds without stopping the machine or otherwise interrupting operation thereof.

The temperature control system may include a circuit having a zero crossing detector to insure that the A.C. switch is turned on only when the line voltage is zero, thereby keeping radio frequency interference at the lowest level and minimizing heat dissipation when the switch is turned on. Also, a circuit may be included to disconnect power to a channel at times when it is necessary to replace or repair components thereof, which circuit is provided to prevent arcing in the connector and annoying shock to personnel performing the replacement and/or repairs.

DESCRIPTION OF THE DRAWING

The foregoing and other features and advantages of the invention will be in part evident and in part pointed out in the following description of an illustrative embodiment thereof, which should be read in conjunction with the accompanying drawings, in which.

DESCRIPTION OF THE PREFERRED EMBODIMENT

Figure 1:
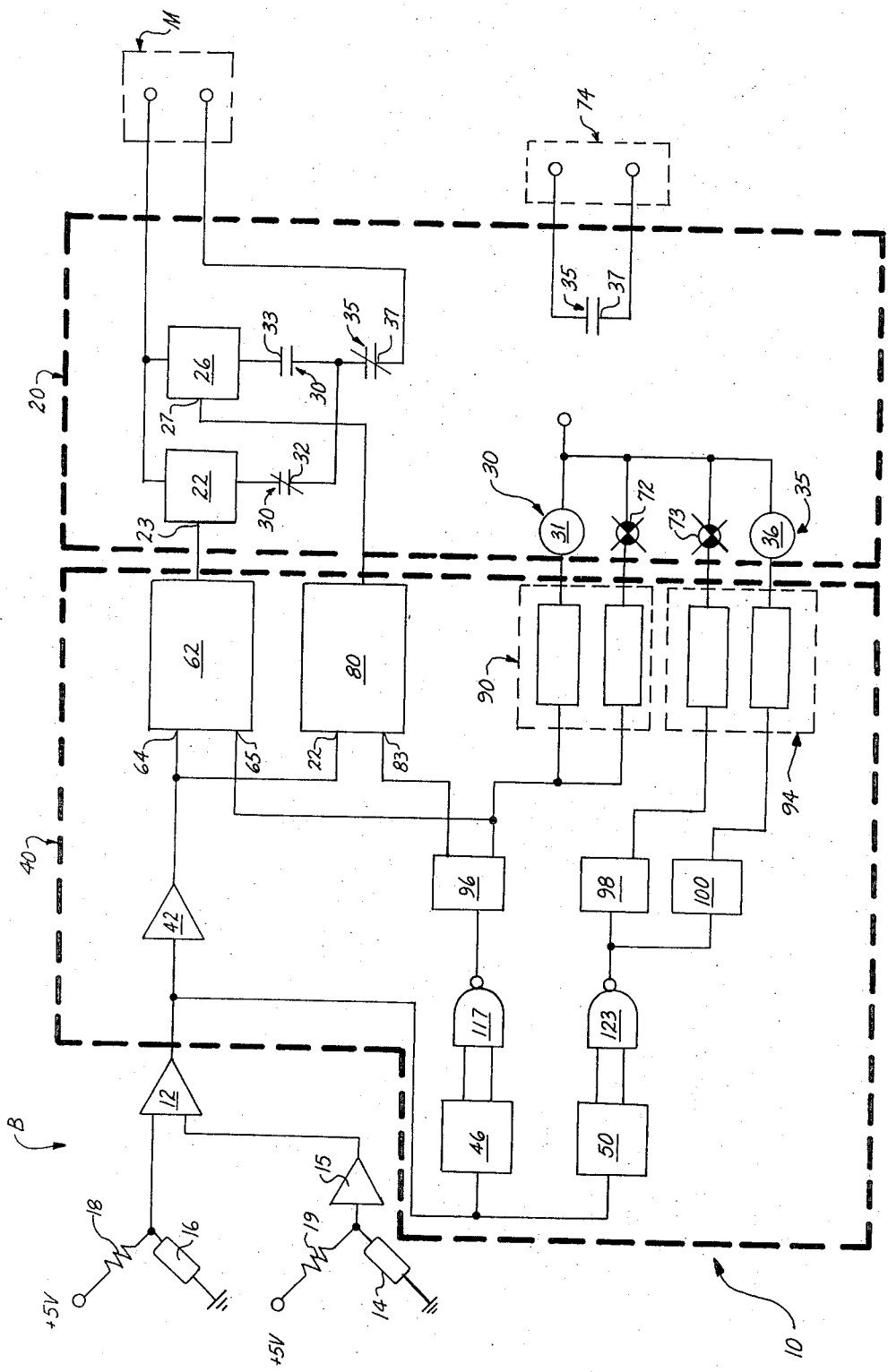
FIG. 1 is a circuit schematic illustration of the temperature control system which operates according to this invention.
Figure 2:
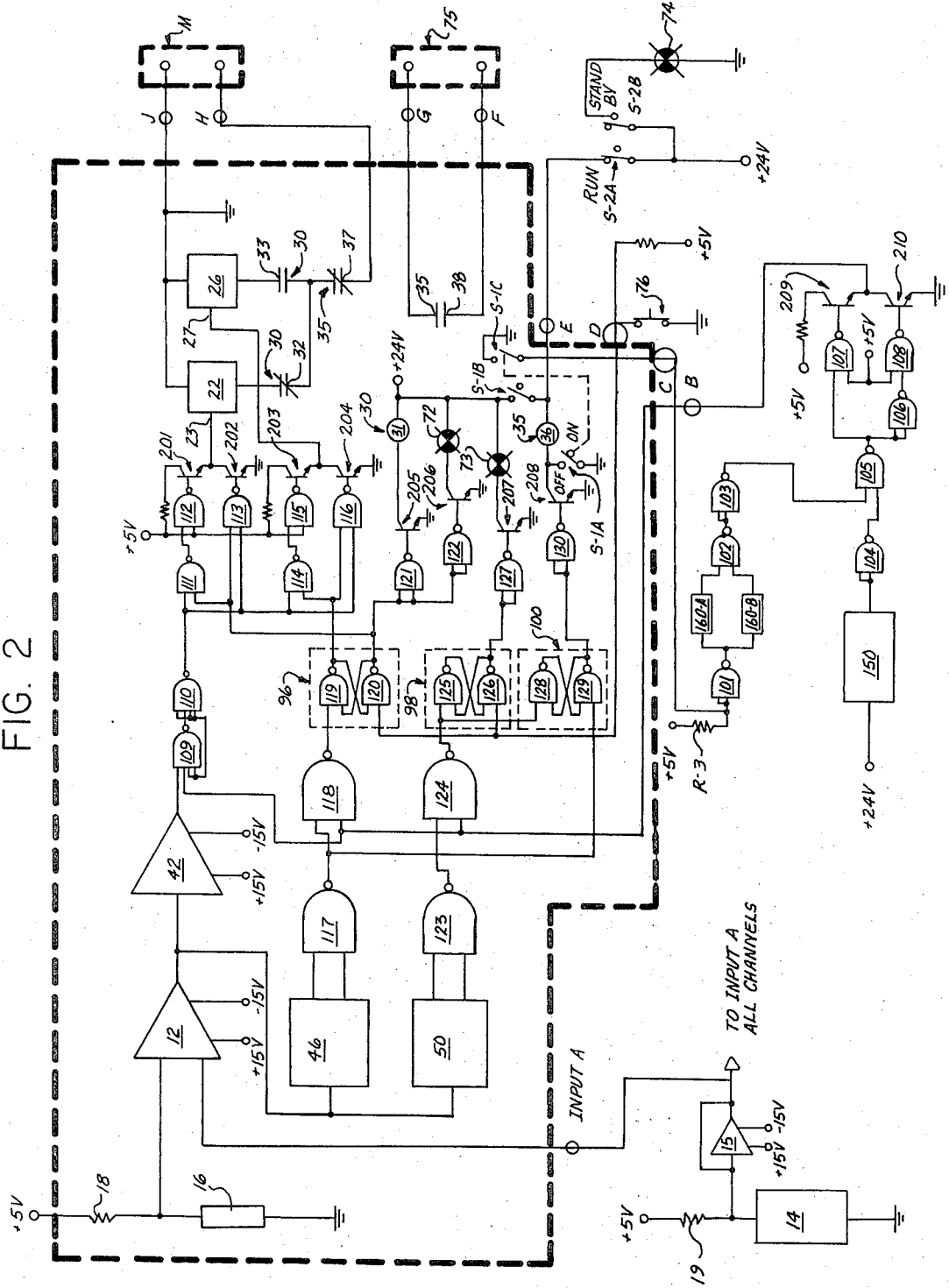
FIG. 2 illustrates in more detail the temperature control system of FIG. 1 as adapted for multi-channel control systems, illustrating the logic of one channel thereof.
Figure 3:
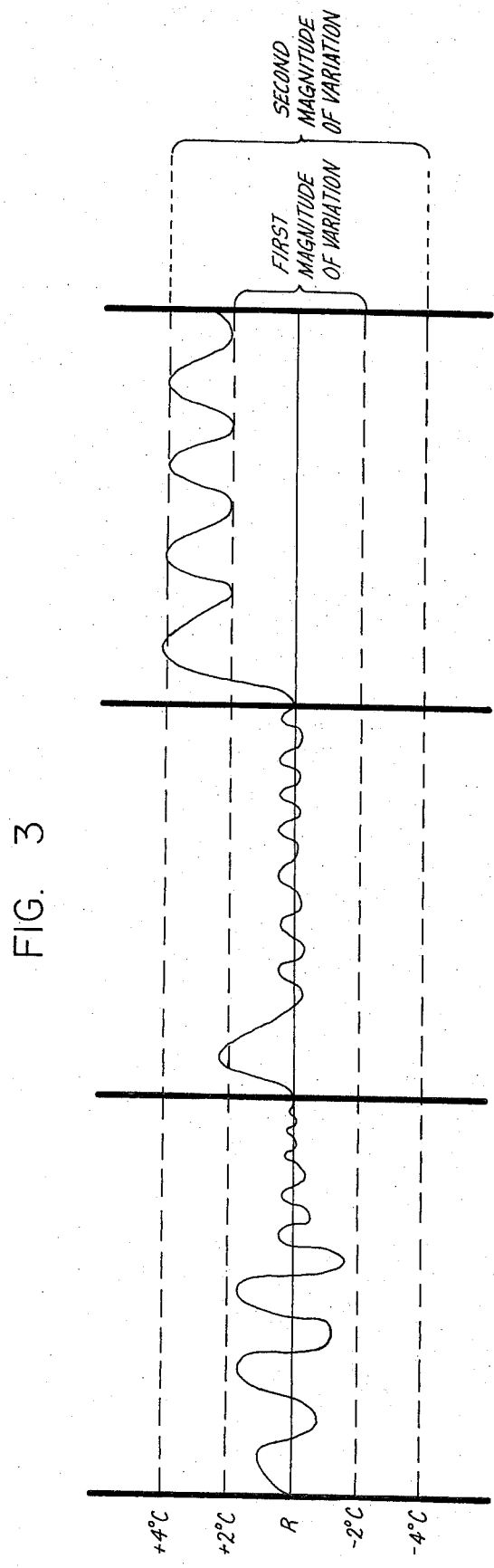
FIG. 3 illustrates graphically operation of the temperature control system as contemplated by this invention as it responds to certain predetermined temperature deviations from the reference temperature.

Referring now to FIGS. 1 and 2, the electrical temperature control system 10 of this invention contemplates, generally, a system wherein the temperature of a medium M is regulated with respect to a reference temperature R (see FIG. 3). The medium M in the example is the heating element of a texturizing machine such as a draw twister or the like, however, application of the control system as described herein is not limited to texturizing and related arts, but may be applied to any process wherein the temperature must be accurately maintained within certain prescribed limits.

A Wheatstone Bridge circuit B having one variable leg 16 for sensing the temperature of the medium and a second variable leg 14 for setting a reference temperature has the output from each of said legs fed, respectively, to the two inputs of a differential amplifier 12, a continuous error voltage is emitted from the differential amplifier 12 and corresponds to the temperature difference between that of the medium M and the reference temperature R, except that said error voltage is inverted in value.

Current to the medium M is normally controlled by one of the solid state A.C. switches of a redundant switching means 20. Operation of the particular switch controlling power to said medium M is accomplished through the control means 40, which control means responds to predetermined temperature variations between the medium M and the reference temperature R and regulates the temperature of said medium M relative to said reference temperature R.

In the example, the variable leg of the bridge B is a Resistance Temperature Detector (RTD) 16 which is a temperature sensitive resistor having a predictable positive temperature coefficient. The variable leg 14 is a variable resistor or, as contemplated herein, an array of resistors that can be adjusted to some value to match the value of the RTD 16 at a predetermined temperature. In a multi-channel system, this output of the bridge is common to a plurality of channels; therefore, its impedance is stabilized by connecting a unity gain amplifier 15 with a very low output impedance in series with the output thereof to minimize error introduced by mismatch when channels are removed from or added back into the system. Fixed resistors 18 and 19 complete the four legs of the bridge circuit B.

The junction of the fixed resistor 18 and the RTD 16 of the bridge B is fed into one input of the differential gain block 12, while the output of the unity gain amplifier 15 from the junction of the fixed resistor 19 and the variable resistors 14 comprising the reference circuit is fed into a second input of the same differential gain block 12. When the output from the two junctions are of equal value, the bridge B is in balance, therefore, the output of the differential gain block 12 is at zero. A change in ambient temperature at the RTD 16 will be reflected in the output of that junction of the bridge B and, accordingly, the corresponding input of the differential gain block 12, producing a small error voltage between the two inputs of the gain block 12. This error voltage will be amplified or multiplied by the gain factor of the differential gain amplifier 12 and inverted, with the amplified and inverted signal emerging as the output thereof.

This output of the differential gain block 12 is fed to three circuits, one of which includes the input of a signal converter means 42, comprising herein a very high gain block having a gain factor in the vicinity of 10,000. From the output of the signal converter means 42, the signal now emerges as a logical signal, having the value of a logical 0 or low when the temperature of the medium is equal to or greater than the reference temperature and the value of a logical 1 or high when the temperature of the medium is less than the reference temperature.

A first logic circuit means 62 of a logic circuit control network 60 receives the signal emitted by the signal converter means 42, which signal is received into one of the two inputs, a signal transmitting input 64, of said logic circuit means 62. The other input thereof comprises a logic enabling input 65 that will be described more fully later. Out put of the first logic circuit means 62 connects to the control terminal 23 of a first solid state A.C. switch 22, which controls, when actuated, power to the medium M. More specifically (see FIG. 2), the logic circuit means 62 includes a network of logical gate circuits, comprising a NAND gate 111 and two NAND gates 112 and 113, together with a pair of discrete transistors 201, 202, which transistors are electrically connected in totem pole configuration. Each gate circuit has two inputs, one a logical enabling input and the other a signal transmitting input, and one output for signal transmission. The signal transmitting input of NAND gate 111 receives the signal emitted by the signal converter means 42 and the logic enabling input thereof receives an enabling signal from the output of a flip flop 96 normally carrrying a logical 1 or high.

Output of the NAND gate 111 is fed into the signal transmitting input of the NAND gate 112, the logic enabling input of which is connected to a 5 volt D.C. source, providing a constant logical 1 thereto, and the output of said NAND gate 112 is connected to the base of the transistor 201. The signal emitted by the signal converter means 42 is also fed into the signal transmitting input of the NAND gate 113, the output of which connects to the base of the transistor 202. The gating signal input of said NAND gate 113 receives the same gating signal from the flip-flop 96 which is received by the corresponding input of the NAND gate 111. The two transistors 201 and 202 are connected in totem pole configuration with the emitter of the transistor 201 being connected to the collector of the transistor 202, while the collector of the transistor 201 is connected to a 5 volt D.C. source with the emitter of the transistor 202 connected to ground. The junction of the emitter of the transistor 201 and the collector of the transistor 202 form the output of the first logic circuit means 62 which connects to the control terminal 23 of a first switching means, comprising the solid state A.C. switch 22.

A second logic circuit means 80 of the same control network 60 also receives the signal emitted by the signal converter means 42 into a signal transmitting input 82 comprising one of two inputs therein. The other input is a logic enabling input 83 and is connected to the other output, normally carrying a logical 0, of the flip-flop 96. The output of this logical circuit means 80 is fed to the control terminal 27 of a second switch means, comprising the solid state A.C. switch 26 that is connected in parallel with the first solid state A.C. switch 22 and controls, when actuated, power to the medium M.

The make up of the logic circuit means 80 corresponds to that of the logic circuit means 62 in that a network of logical gate circuits, comprising a NAND gate 114 and two NAND gates 115 and 116, together with discrete transistors 203 and 204 in totem pole configuration, are electrically connected in the same manner as that described in connection with the logic circuit means 62. The gating signal inputs, however, of the NAND gate 114 and the NAND gate 116 are connected to the other output, normally carrying a logical 0, of the flip-flop 96 and the output of said logic circuit means 80 feeds to the control terminal 27 of the second switching means, comprising the solid state A.C. switch 26. In view of the detailed description previously provided for the first logical circuit means 62 and the substantial similarity between said first logical circuit means 62 and the second logic circuit means 80 (see FIG. 2) a detailed description of said second means 80 is not deemed necessary for sufficient understanding thereof.

The solid state A.C. switches 22, 26 are connected in parallel and selectively control power to the medium M. Selection of the particular switch and actuation thereof to control said power is accomplished, in part, by means of trip circuits 32 and 33 connected in series with said switches 22 and 26, respectively (see FIG. 2). The trip circuits 32 and 33 are part of an interchanging means (hereinafter electrical relay 30) which will be described more fully hereinafter, except that for now it should be noted that the trip circuit 32 is normally closed while the trip circuit 33 is normally open, thereby actuating the A.C. switch 22 for operation to control power to the medium M and deactuating the A.C. switch 26. Another trip circuit 37, part of an interchanging means (hereinafter electrical relay 35), also to be described later, is located in the A.C. power line in series with both of said A.C. switches 22 and 26, which trip circuit 37 is normally closed but which, when opened, will disconnect all of said A.C. switches, thereby removing current from the medium M.

The logical enabling signal received, as hereinbefore described, in the logical enabling inputs of the logic circuit means 62 and 80 is emitted by the flip-flop 96, which flip-flop includes two NAND gates 119 and 120, each having a signal transmitting input, a logical enabling input and a signal transmitting output. The output of each gate is connected first to the logical enabling input of the other gate in typical flip-flop configuration, and the output of the NAND gate 120 is further connected to the logical enabling inputs of the NAND gates 111 and 113. The output of the NAND GATE 119 is likewise connected to the logical enabling inputs of the NAND gates 114 and 116. A 5 volt D.C. source is connected to the signal transmitting input of the NAND gate 120, thereby providing a logical 1 at that input, while the signal transmitting input of the NAND gate 119 receives the output signal of a temperature variation detector 46, comprising a plus or minus 2°C. temperature detector through a series of intermediate NAND gates 117 and 118, the purpose of which will become apparent later. The normal state setting of the flip-flop 96, upon resetting thereof with reset 76, as will be explained later, contemplates a logical 1 at the signal transmitting input of the NAND gate 120, also a logical 1 at the corresponding input of the NAND gate 119 with the output of said NAND gates 119 and 120 at a logical 0 and a logical 1 respectively.

The 2°C. temperature detector has one input which receives the continuous error signal emitted from the differential gain block 12. The two outputs of the 2°C. temperature detector 46, which are normally high when temperature of the medium as sensed by the RTD 16 is within the plus or minus 2°C. limits, connect to the two inputs of the NAND gate 117, the output of which emits a logical 1 when the output of the differential gain block 12 becomes sufficiently high or low enough to trip the plus or minus 2° detector threshhold. At other times this output will be a logical 0.

Output of the NAND gate 120 also connects to two other circuits, collectively comprising a third logic circuit means 90, which will be described next. First is a triggering circuit for an energizing circuit 31 of the relay 30. Connected in series with a 24 volt D.C. source is the energizing circuit 31 of the relay 30 and the collector terminal of a transistor 205, the emitter terminal thereof being connected to ground. The base of said transistor 205 receives to the output of a NAND gate 121, the inputs of which connect to said output of the NAND gate 120. The second circuit is an annunciator lamp 72, likewise connected in series with a 24 volt D.C. source and the collector terminal of a transistor 206, with the emitter terminal thereof being connected to ground. The base of the transistor 206 receives the output of a NAND gate 122, both inputs of which are connected to the output of said NAND gate 120 of the flip-flop 96.

A second temperature variation detector 50, comprising a plus or minus 4°C. temperature detector, has as its input the continuous error signal emitted from the differential gain block 12, the output of which connects to the input of a NAND gate 123. Output from the NAND gate 123 is fed through an intermediate NAND gate 124 to the input of a second flip-flop 98. The flip-flop 98 comprises two NAND gates 125 and 126, interconnected in typical flip-flop fashion, with the signal transmitting input of the NAND gate 125 receiving the output from the NAND gate 123 through the NAND gate 124. The signal transmitting input of the NAND gate 126 receives a 5 volt D.C. supply, while the output thereof is fed into a second annunciator lamp circuit similar to the one hereinbefore described. This second annunciator amp lamp circuit includes, in series from a 24 volt D.C. supply, an annunicator lamp 73 connected to the collector terminal of a transistor 207, the emitter of which is connected to ground. The output of the NAND gate 127 connects to the base of said transmitter 206 while both inputs thereof receive the output of the flip-flop 98.

A third flip flop 100, including NAND gates 128 and 129, receives at the signal transmitting input of the NAND gate 128 the output of NAND gate 123 as furnished through the NAND gate 124. The signal transmitting input of the NAND gate 129 thereof connects to the output of the NAND gate 117 for reasons that will become apparent later. Output of the flip-flop 100, representing the output of the NAND gate 129, is connected to a circuit containing a second interchanging means 35, substantially similar to that of the interchanging means 30. The control terminal 36 of said interchanging means 35 receives a 24 volt D.C. supply and connects in series therewith to the collector terminal of a transistor 208, the emitter of which connects to ground. The base of the transistor 208 receives the output from a NAND gate 130, the input of which connects to the output of said flip-flop 100.

In view of the foregoing description of a preferred embodiment of the invention, and with reference to the drawings, the operation of the invention as contemplated by the preferred embodiment can now be explained.

When a balanced condition exists on the bridge B, both inputs of the differential gain block 12 are equal, producing no error voltage and causing the output of said block 12 to be at 0. This output is multiplied by a very high gain block 42, having a gain factor in the vicinity of 10,000, but with the input thereof at 0 volts, the output will also be 0 volts. The output of the gain block 42 at this point constitutes a logical signal and in this instance is equivalent to a logical 0 or low. The low existing at the output of the gain block 42 enters the signal transmitting input of the NAND gate 111 after passing through two intermediate NAND gates 109 and 110, the purpose of which will be described later. The logical enabling input of said NAND gate 111 receives the output signal from the NAND gate 120 of the flip-flop 96, with said flip-flop set for the signal therefrom to enable said NAND gate 111. Accordingly, output of the NAND gate 111 is high, causing a high to appear at the signal transmitting input of the NAND gate 112 which joins with the high appearing at the logical enabling input thereof to produce a low at the output of said NAND gate 112. This low is received at the base of the transistor 201, disabling said transistor 201 and resulting in its being turned off. The signal transmitting input of the NAND gate 113 also receives the low from the gain block 42, through intermediate NAND gates 109 and 110, while the logical enabling input of said NAND gate 113 receives the same enabling input signal from the output of the NAND gate 120 of the flip-flop 96. The combination of a logical high and low at the inputs of the NAND gate 113 produces a logical high at the output of said gate, which high appears at the base of the transistor 202, causing said transistor to be enabled and, therefore, on. With the transistor 201 off and the transistor 202 on, the control terminal 23 of the solid state A.C. switch 22 connects to ground, thereby disabling said A.C. switch 22 and preventing the flow of current to the medium M.

If the temperature of the medium M decreases slightly, the resistance of the RTD 16 will decrease and an error voltage will appear between the two inputs of the differential gain block 12, making its output positive. This positive voltage will be amplified and will appear at the output of the high gain block 42 as a logical 1 or high which appears at the signal transmitting input of the NAND gate 111. The logical enabling input of the NAND gate 111 is also high from the output of the NAND gate 120 of the flip-flop 96, bringing a low at the signal transmitting input of the NAND gate 112. The output of said NAND gate 112 becomes high, turning the transistor 201 on. The signal transmitting input of the NAND gate 113 receives the high from the gain block 42, through intermediate NAND gates 109 and 110, and the high appearing at the logical enabling input thereof, causes the output of said NAND gate 113 to be low. Accordingly, the transistor 201 is transmitting while the transistor 202 is not, thereby causing a high to appear at the gate of the A.C. switch 22, turning said switch on to apply current to the medium M. Current applied to the medium M will then bring the temperature thereof up until the bridge is balanced once more, at which time the logical sequence as described herein will turn said A.C. switch 22 off.

During operation of the preferred embodiment as hereinbefore described, the logic enabling input of the NAND gates 114 and 116 receive a logical low or disabling input from the output of the NAND gate 119 of the flip-flop 96. As a result the transistor 203 remains off while the transistor 204 remains on, causing the solid state A.C. switch 26 to remain off. Also, with logical highs appearing at both inputs of the NAND gate 121, the output thereof is low which prevents the transistor 205 from transmitting to ground and further causes the electrical relay 30 from energizing. Accordingly, the trip circuit 33 is open, removing the solid state A.C. switch 26 from the system and the trip circuit 32 is closed, connecting the solid state A.C. 22 switch into the system.

This is the normal operation of the temperature control system and said system will remain operating in this manner as long as there is no component failure or the desired temperature is not changed.

Assuming a failure of the A.C. switch 22, such failure will ordinarily cause this switch to remain on even though the logic controlling it will attempt to instruct the switch to turn off. The temperature of the medium M, therefore, will rise until the output of the differential gain block 12 becomes high enough to trip the plus 2° detector threshold of the plus or minus 2°C. detector 46. When this occurs a low will be present at one of the inputs of the NAND gate 117 changing the output thereof to a high. A low will be received at the input of the flip-flop 96, because of the intermediate NAND gate 118, the purpose of which will be described in connection with the NAND gates 109 and 110, thereby setting the flip-flop 96. Output of the NAND gate 119 will now be high with the output of the NAND gate 120 low. When output of the NAND gate 120 is low, the NAND gate 121 will emit a logical high, causing the transistor 205 to transmit and thereby energize the control terminal 31 of the electrical relay 30. Accordingly, the normally closed contract 32 in series with the A.C. switch 22 will open and the normally open contact 33 in series with the A.C. switch 26 will close, taking the A.C. switch 22 out of the circuit and substitute therefore the A.C. switch 26. The NAND gate 120, now having the output a logical low, will also disable the NAND gates 111 and 113, and the NAND gates 119, now having at its output a logical high, enables the NAND gates 114 and 116. Accordingly, the signal coming from the high gain block 42 will follow the path through the NAND gates 114, 115 and 116 to control the A.C. switch 26 instead of the A.C. switch 22 and the process will return to normal.

Simultaneously with the turning on of the transistor 205 to energize the electrical relay 30, the transistor 206 is turned on and causes the annuciator lamp 72 to come on.

Even though the control temperature will return to normal, the annunciator lamp 72 will remain on telling the operators or the maintenance personnel that there is a fault on that channel. After repair has been effected, this annunciator can be cancelled and the circuit can be switched back to the A.C. switch number 22 by pressing the reset button 76 which will bring a logical 0 to the input of the NAND gate 120 thereby resetting the flip-flop 96 and bringing a high at the output of the gate 120. This action turns off the transistors 205 and 206, disables gates 114, 116, enables gates 111, 113 and the system is operating normally again.

Even with a failure of the solid state A.C. switch 22, the temperature deviation of only 2° was noticed for a very short period of time (see FIG. 3).

Returning to the condition existing after the failure of the A.C. switch 22 and causing the system to automatically switch to the A.C. switch 26, it is now assumed that the A.C. switch 26 is also defective. The temperature of the medium M will continue to rise with output of the differential gain block 12 responding accordingly until the threshold of the plus or minus 4°C. detector 50 is tripped. At this point the NAND gate 123 will receive a low at one input thereof, causing a high to appear at the signal transmitting input of the NAND gate 124, the purpose of which will be described later, and causing said gate 124 to emit a lot to the input of the flip-flop 98. A low at the input of said flip-flop 98 will cause the setting thereof along with the setting of the flip-flop 100. Output of the flip-flop 98 and 100 will now be low, turning on the transistors 207 and 208, thereby turning on the annunciator lamp 73 and energizing the energizing circuit 36 of the electrical relay 35. When electrical relay 35 is energized, the contact 37 thereof, connected in series with all of the solid state A.C. switches in that channel will open and completely remove the current from the medium M. Accordingly, temperature of the medium will then decrease until output of the differential gain block 12 is low enough to release the 2° detector 46, therefore forcing a low at the output of NAND gate 117 which will reset the flip-flop 100 and cause the output of the NAND gate 129 to become high, thereby turning off the transistor 208 and de-energizing the circuit 36 of the electrical relay 35. Current will be reapplied to the A.C. switch 26 and, therefore, restore current to the medium M. The A.C. switch 26 is still assumed to be defective, thereby causing the temperature of said medium M to rise again and the same process will be repeated. Meanwhile, the annunciator lamp 73 will remain on because resetting the flip-flop 100 through the signal transmitting input connection of the NAND gate 129 with the output from the NAND gate 117 will not cause the flip-flop 98 to reset. Both of the annunciator lamps 72 and 73 must be reset manually.

Turning now to the purpose of the NAND gates 109, 110, 118 and 124, the gating signal inputs of these gates are connected in parallel with the output of a pair of transistors 209 and 210, which transistors are connected in totem pole configuration. The collector of the transistor 209 receives a 5 volt D.C. supply while the emitter thereof connects to the collector of the transistor 210, the emitter of which connects to ground. The base of the transistor 209 receives the output of a NAND gate 107, while the base of the transistor 210 receives the output of NAND gate 108. The logical enabling input of the aforementioned gates each receive a 5 volt D.C. supply, while the signal transmitting input of the NAND gate 107 receives to the output from a NAND gate 105. The corresponding input of the NAND gate 108 receives the output of a NAND gate 106 with both inputs of said NAND gate 106 connecting also to the output of the NAND gate 105. The signal transmitting input of the NAND gates 105 receives the output from a NAND gate 104 the input of which is connected to the output of a zero crossing detector 150. A 24 volt D.C. supply connects to the zero crossing detector 150 to furnish power thereto. The logical enabling input of the NAND gate 105 connects to the output of a NAND gate 103 which itself receives the output from a NAND gate 102. Each input of the NAND gate 102 is connected to the output of a one shot multivibrator, the inputs of which connect to the output of a NAND gate 101. The input for this gate is received from a 5 volt D.C. supply, which input is also connected to ground through one terminal S–1C of a triple pole switch S–1.

To keep radio frequency interference at the lowest level and to minimize heat dissipation upon turning on of an A.C. switch, said switch must be turned on when the line voltage is at zero. This is accomplished by sampling the line frequency by passing it through the zero crossing detector 50. The output of the zero crossing detector, which is normally high, becomes a negative pulse of approximately 250 microseconds every time the line voltage is in the vicinity of zero volts, which takes place every 8.33 milleseconds. When the output of the zero crossing detector 50 is at 0, the output of the NAND gate 104 is high. Assuming that the NAND gate 105 is enabled, its output is low, thereby keeping the transistor 209 ON through the NAND gate 107 and turning the transistor 210 OFF through the NAND gate 106 and the NAND gate 108. The totem pole output of the transistors 209 and 210 is high, keeping the gates 109, 118, and 124 enabled. When a positive pulse appears at the output of the zero crossing detector 50, the output of the NAND gate 104 is low making the output of the NAND gate 105 high, thereby turning OFF the transistor 209 and turning ON the transistor 210. This output then disables gates 109, 118 and 124. It is clear at this point that an A.C. switch can be turned on only if the output of the high gain block 42 is high and there is a strobe from the totem pole output of transistors 209 and 210.

Another major advantage of this strobing is that it makes the digital logic portion of the controller insensitive to random noise pickup for approximately 97 percent of the time.

When a solid state switch has to be replaced, the power must be disconnected from the circuit to prevent arcking in the connector and/or annoying shock to the maintenance personnel. The three-pole switch S–1 will accomplish this by energizing, when closed, the control terminal 36 to the electrical relay 35. When pole S1–C of the switch S–1 is closed, it will ground the input of the NAND gate 101, thereby bringing its output high. One of the monostable multi-vibrators 160A or 160B, commonly called one-shot circuits, will be triggered by a positive going transition. Its output will then go low for a period of approximately 50 milleseconds bringing output of the NAND gate 102 high and the output of the NAND gate 103 low. By this fact, the NAND gate 105 is disabled, therefore, strobes will be inhibited for that period preventing noise propagation to the other channels that could result by opening of the energizing contact 37 of the electrical relay 35. When replacement of the possibly defective A.C. switch is effected, the switch must be turned on again for proper operation of that channel. Pole S–1C of said switch S is opened and the input of the NAND gate 101 becomes high through the pull up of resistor R–3. The output of the NAND gate 101 has now a negative going transition, causing the other one-shot circuit which is sensitive only to negative going transitions, to have its output low for an approximate period of 50 milliseconds and again to inhibit the strobe circuit.

A standby switch, comprising a double pole switch S–2, has one pole thereof, pole S–2A, connected in series with a 24 volt D.C. source on one side and the energizing circuit 36 of the electrical relay 35 on the other. Pole S–2B thereof connects also to a 24 volt D.C. source on one side with an annunciator lamp 74 on the other in series with ground. The standby switch S–2 is turned to the ON position when current is initially supplied to the medium M and remains on to remove said electrical relay 35 from the system until the temperature of the medium M is within plus or minus 4°C. of the reference temperature R, at which time the switch S–2 is opened and the annunciator lamp 74 is turned off.

A second trip circuit 38 of the electrical relay 35, which trip circuit is normally open when said relay 35 is de-energized may be connected into a central alarm annunciator circuit 75 to indicate the energizing of said relay 35.

While a preferred embodiment of the invention has been specifically shown and described, it will be appreciated that this was for purposes of illustration only and not for purposes of limitation, the scope of the invention being in accordance with the following claims.

What is claimed is:

1. In an electrical temperature control system for detecting and regulating the temperature of a medium with respect to a reference temperature, said system including means for emitting a continuous error voltage corresponding to the temperature difference between said reference and said medium, the improvement comprising, in combination therewith:
   a. redundant switching means for controlling through selected switches thereof, when actuated, the current flow to said medium, and
   b. control means responsive to predetermined magnitudes of variation in said error voltage to actuate selected switches of said redundant switching means and operate said actuated switch to control the current flow to said medium and regulate the temperature thereof with respect to said reference temperature.

2. Apparatus as claimed in claim 1, wherein the redundant switching means includes:
   a. first switching means for controlling, when actuated, current flow to said medium and regulating the temperature thereof with respect to said predetermined reference temperature, said first switching means having a control terminal connecting to said control means;
   b. second switching means, activated in response to a first magnitude of variation in said error voltage and connected in parallel with said first switching means for controlling, when actuated, current flow to said medium and regulating the temperature thereof with respect to said predetermined reference temperature, said second switching means having a control terminal connecting to said control means; and
   c. interchanging means connected in series with said first switching means and said second switching means for selectively deactuating, when energized, said first switching means and actuating said second switching means, said interchanging means having an energizing terminal connecting to said control means.

3. Apparatus as claimed in claim 2, wherein: the interchanging means is an electrical relay having two trip circuits and one energizing circuit, one of said trip circuits normally closed and the other of said trip circuits normally open when said relay is deenergized, said normally closed trip circuit connected in series with said first switching means and said normally open trip circuit connected in series with said second switching means, the energizing circuit connecting to said control means.

4. Apparatus as claimed in claim 2, wherein the control means includes:
   a. signal converter means to receive said continuous error voltage and emit in response thereto first logical signals, which signals correspond to variations between the temperature of said medium and said reference temperature;
   b. temperature variation detector means to receive also said continuous error voltage and emit in response thereto second logical signals, which second signals correspond to a first predetermined magnitude of variation between the temperature of said medium and said reference temperature; and
   c. a logic circuit network responsive to said first logical signals emitted by said signal converter means to operate said first switching means to control current flow to said medium and regulate the temperature thereof with respect to said reference temperature, said logic circuit network further responsive to said second logical signals emitted by said temperature variation detector means to energize said interchanging means, deactuating said first switching means and actuating said second switching means, and operate said second switching means in response to said first logical signals to control current flow to the medium and regulate the temperature thereof relative to said reference temperature.

5. Apparatus as claimed in claim 4, wherein the logic circuit network includes:
   a. first logic circuit means having an output and two inputs, said inputs comprising a signal transmitting input and a logical enabling input, said output connected to the control terminal of said first switching means and said signal transmitting input receiving the first logical signals emitted by said signal converter means to operate, when said first logic circuit means is enabled, said first switching means to control current flow to said medium and regulate the temperature thereof with respect to said reference temperature;
   b. second logic circuit means having an output and two inputs, said inputs comprising a signal transmitting input and a logical enabling input, said output connected to the control terminal of said first switching means and said signal transmitting input receiving the first logical signals emitted by said signal converter means to operate, when enabled, said second switching means to control current flow to said medium and regulate the temperature thereof with respect to said reference temperature;
   c. third logic circuit means having an output connected to the control terminal of said interchanging means for energizing, when enabled, said interchanging means to deactuate said first switching means and actuate said second switching means, said third logic circuit means having a logical enabling input to receive a logical enabling signal to enable and disenable said third logical circuit means responsive thereto; and
   d. an enabling means having two outputs selectively connected to the logical enabling inputs of said first, second and third logical circuit means and one input receiving the second logical signals emitted by said temperature variation detector means, said enabling means first enabling said first logic circuit means and disenabling said second and third logic circuit means and responsive to said second logical signals disenabling said first logic circuit means and enabling said second and third logic circuit means.

6. Apparatus as claimed in claim 5, wherein the enabling means is a bi-stable multivibrator.

7. Apparatus as claimed in claim 4, wherein the control means further includes:
   a. a second temperature variation detection means to receive said continuous error voltage and emit in response thereto third logical signals, which third logical signals correspond to a second predetermined magnitude of variation between the temperature of said medium and said reference temperature;
   b. a second interchanging means connected in series with said redundant switching means to deactuate, when energized, all of said switching means of said redundant switching means and remove the current from said medium, said second interchanging means having an energizing terminal connecting to said control means; and
   c. logic circuit means connected to said energizing terminal and responsive to said logical signals emitted by said second temperature variation detection means to energize said second interchanging means and remove all current from said medium.

8. An electrical temperature control system for detecting and regulating the temperature of a medium with respect to a reference temperature, said system including bridge circuit means for detecting the temperature of said medium and setting said reference temperature, said bridge circuit means having means for emitting a continuous error voltage corresponding to the difference between the temperature of said medium and said reference temperature, said control system comprising in combination:
   a. first switch means for controlling, when actuated, current flow to said medium, said first switch means having a control terminal;
   b. second switch means connected in parallel with said first switch means for controlling, when actuated, current flow to said medium, said second switch means having a control terminal;
   c. first interchanging means connected in series with said first and said second switch means for alternatively activating one of said switching means and deactivating the other, said interchanging
   c. second interchanging means in series with all of said switch means for removing, when energized, current flow to said medium, said second interchanging means having a control terminal;
   e. a control circuit coupled to the control terminals of said first and second switching means and said first and second interchanging means, said control circuit comprising:
      1. signal converter means to receive said continuous error voltage from said bridge circuit means and emit in response thereto logical signals corresponding to variations between the temperature of said medium and said reference temperature;

2. first temperature variation detector means to receive said continuous error voltage and emit logical signals responsive to a first predetermined magnitude of variation between the temperature of said medium and said reference temperature;

3. second temperature variation detector means to receive said continuous error voltage and emit logical signals responsive to a second predetermined magnitude of variation between the temperature of said medium and said reference temperature;

4. logic circuit means responsive to said logical signals emitted by said signal converter means to operate said first switching means to control current flow to said medium and regulate the temperature thereof with respect to said reference temperature, said logic circuit means further responsive to said signals emitted by said first temperature variation detector means to energize said first interchanging means, deactuate said first switching means and actuate said second switching means for operation of said second switching means by said logic circuit means responsive to said logical signals emitted by said signal converter means to control current flow to said medium and regulate the temperature thereof with respect to said reference temperature, said logic circuit means further responsive to said signals emitted by said second temperature variation detector means to selectively energize said second interchanging means and remove all current from said medium to regulate the temperature thereof between said second magnitude of variation therefrom and said first magnitude of variation with respect to said reference temperature.

\* \* \* \* \*